Patented Sept. 23, 1947

2,427,995

UNITED STATES PATENT OFFICE 2,427,995

SULFOFLUORIDES OF AZOIC DYESTUFFS

Robert Prescott Parker, Somerville, and Corris Mabelle Hofmann, Bound Brook, N. J., assignors to American Cyanamid Company, New York, N. Y., a corporation of Maine No Drawing. Application July 31, 1944,
Serial No. 547,517

15 Claims. (Cl. 260—188)

The present invention relates to new disazo dyestuffs of the ice color type. According to the present invention it has been found that valuable new disazo dyestuffs of the ice color type, that is to say insoluble in water, may be obtained by coupling an ice color coupling component with a diazotized p-aminoazo compound of the general formula:

in which Ar is a radical of the benzene series free from water solubilizing groups and Ar' is a radical of the benzene and naphthalene series free from water solubilizing groups, at least one of the groups Ar and Ar' containing at least one sulfonyl fluoride group. The disazo dyestuffs thus produced may be represented by the formula:

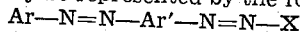

in which Ar and Ar' have the same significance and X is a residue of an ice color coupling component.

The new dyestuffs exhibit very good fastness properties in general and surprisingly good wash fastness properties. It could not be predicted that the sulfonyl fluoride group incorporated in these dyestuffs as finished products would be so little sensitive to alkaline agents. Furthermore, the presence of the sulfonyl fluoride group in the dyestuffs of the present invention has been found to exhibit a hypsochromic effect which causes generally lightening and brightening of the shade, rendering the final dyestuffs more valuable because of this brilliance.

Among the ice color coupling components which produce useful products may be listed by way of example such compounds as: beta naphthol, 8-amino-2-naphthol, 8-acetylamino-2-naphthol, benzoyl naphthol, pyrazolones, pyrazyl pyrazolones, hydroxy benzofluorenones, hydroxy derivatives of phenyl naphthylamines such as 7-hydroxy-1-naphthyl-m-hydroxy phenylamine; particularly the various N-substituted amides such as arylides of 2-hydroxy-3-naphthoic acid, of 5,6,7,8-tetrahydro-2-hydroxy-3-naphthoic acid, of 2-hydroxy-3-anthroic acid, of methyl and dimethyl salicyclic acid, of hydroxy carbazol carboxylic acids, of 3,7-dihydroxy-naphthalene-2,6-dicarboxylic acid, of hydroxy-dibenzofuran carboxylic acid, of hydroxy benzo thiophene carboxylic acid, etc., and the arylides of aceto acetic acid, furoyl acetic acid, benzoyl acetic acid, terephthaloyl-bis-acetic acid and the like. The arylide group in the coupling component may be a single aromatic group such as the radical of aniline or of an aniline derivative or of a naphthylamine, or it may be the radical of a heterocyclic amine, such as, for example, of an amine of the benzothiazole series or of a diamine of the diphenylene oxide or diphenylene sulfone series.

The p-aminoazo compounds used to produce the disazo dyestuffs of the present invention are themselves new compounds and form a portion of the subject matter of our copending application Serial No. 547,516, filed July 31, 1944. These compounds must have at least one sulfonyl fluoride group in either their diazo part or coupling part. They may be made from any ice color diazo components. Examples of such diazo components that contain the sulfonyl fluoride group are: 3-aminobenzene sulfonyl fluoride, 4-aminobenzene sulfonyl fluoride, 3-amino-4-methyl benzene sulfonyl fluoride, 3-amino-4-chloro benzene sulfonyl fluoride, 3-amino-4-methoxy benzene sulfonyl fluoride, 4-amino-5-nitro benzene sulfonyl fluoride, 5-amino-benzene-1,3-disulfonyl fluoride, 3-amino-4-trifluoromethyl benzene sulfonyl fluoride; 3,3'-diamino-5,5'-di-fluorosulfonyl diphenyl sulfone; 4-amino diphenyl-2-sulfonyl fluoride and 2-phenoxy-5-aminobenzene sulfonyl fluoride.

The coupling components for producing the p-amino azo compounds may be any of the ordinary primary amino compounds of the benzene and naphthalene series capable of coupling para to the amino group and free from water solubilizing groups. They may also include components which may in addition contain one or more sulfonyl fluoride groups such as for example: 3-amino-4-methyl benzene sulfonyl fluoride, 3-aminobenzene sulfonyl fluoride, 3-amino-4-chloro benzene sulfonyl fluoride, 3-amino-4-methoxy benzene sulfonyl fluoride, 3-amino-4-trifluoromethyl benzene sulfonyl fluoride.

As the dyestuffs are substantially insoluble in water they may be used as pigments in which case, if desired, they may be produced on a substrate. They are also suitable for developing on cellulosic fibers by conventional printing or dyeing processes. Thus for example the diazo component may be printed on goods previously padded with a solution of the coupling component in the customary manner. A series of shades of excellent fastness are produceable.

The invention will be described in greater detail in conjunction with the following specific examples which are illustrative. All parts are by weight unless otherwise noted.

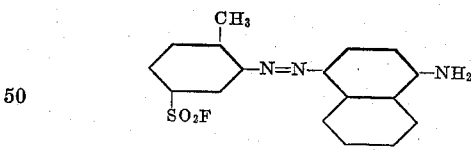

A solution of 9.5 parts of 3-amino-4-methyl benzene sulfonyl fluoride in 100 parts of water containing 14.9 parts of hydrochloric acid (1.19) is diazotized at 0° C. by the addition of 3.5 parts of sodium nitrite dissolved in 15 parts of water. This diazo solution is clarified and is added to a solution of alpha-naphthylamine prepared by dissolving 7.5 parts of alpha-naphthylamine in 200 parts of water containing 5.5 parts of hydrochloric acid (1.19) at the boil and then cooling. When coupling is complete, sodium acetate is added until the solution is no longer acid to Congo red test paper and the insoluble dyestuff is separated by filtration and is washed on the filter with water. 3-(4'-aminonaphthylazo)-4-methyl benzene sulfonyl fluoride, when purified by crystallization from dilute ethyl alcohol, melts at 197°-200° C. and has the above formula.

*Example 2*

5.2 parts of the amino-azo dyestuff obtained as described in Example 1 are stirred in 14 parts of water until well wetted and are treated with 7.5 parts of hydrochloric acid (1.19) and then 1.1 parts of sodium nitrite are added at a temperature of 30°-35° C. After stirring for ¾ hour, 150 parts of water are added and 0.15 part additional sodium nitrite are dissolved in the solution. After stirring an additional 15 minutes, the solution is clarified and the filtrate is treated with sodium chloride. The precipitated diazonium chloride is collected on the filter and is dried at low temperature.

*Example 3*

1 part of the diazonium chloride as obtained in Example 2 is intimately mixed by blending with 3.5 parts of magnesium sulfate dihydrate.

1 part of this color blend is dissolved in 29 parts of water and is treated with 70 parts of suitable carbohydrate thickener. The paste is printed from an engraved copper roll on cotton piece goods which have been previously impregnated with the anilide of 2-hydroxy-3-naphthoic acid in an alkaline solution. The print is dried, is rinsed in fresh water, is treated in a ½% soap solution at 65° C., is rinsed in fresh water and is dried. A bluish-grey pattern is obtained.

*Example 4*

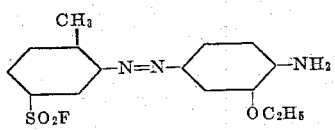

9.5 parts of 3-amino-4-methyl benzene sulfonyl fluoride are stirred in 100 parts of water containing 14.9 parts concentrated hydrochloric acid and diazotized at 0°-5° C. with a solution of 3.5 parts sodium nitrite in 15 parts of water. The resulting diazo solution is clarified and is added to a chilled solution of 7.2 parts ortho-phenetidine in 200 parts of water containing 5.4 parts concentrated hydrochloric acid. Coupling is completed after 4 hours at which time the free dyestuff base is liberated by addition of crystalline sodium acetate until the solution is no longer acid to Congo red test paper. The insoluble dyestuff is filtered off and washed well on the filter with water.

When this dyestuff is diazotized according to the procedure described in Example 2, a diazo solution is obtained. This solution is treated with sodium acetate until it no longer gives an acid reaction when spotted on Congo red test paper. To this buffered diazo bath, cotton piece goods previously impregnated with the anilide of 2-hydroxy-3-naphthoic acid are added. After turning in the diazo bath for several minutes, the cotton piece goods are rinsed in warm water, treated in 2% sodium hydroxide solution at 40° C. and then in 1% soap solution at 65° C. after rinsing and drying, the goods are heavily dyed a deep maroon color.

*Example 5*

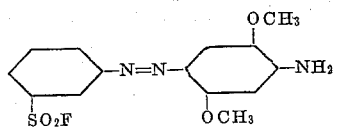

8.5 parts of 3-amino benzene sulfonyl fluoride hydrochloride dissolved in 50 parts of water by the addition of 26.5 parts of 17% hydrochloric acid are diazotized at 0°-5° C. by addition of 2.8 parts of sodium nitrite dissolved in 10 parts of water. The diazo solution is clarified and is slowly dropped into a chilled and stirred solution of 6.5 parts of 2,5-dimethoxy aniline in 80 parts of water containing 11 parts of 17% hydrochloric acid. Coupling is rapid with production of a reddish-orange solid. Solid sodium acetate is then added until the solution is no longer acid when spotted on Congo red test paper. The resultant insoluble orange dyestuff is filtered off and is washed with water.

When purified by crystallization from 90% alcohol, an orange-red crystallate is obtained.

*Example 6*

1.7 parts of the azo dyestuff obtained as in Example 5 are well slurried in 14 parts of 50% acetic acid and 0.35 part of sodium nitrite is added. The temperature is lowered to 0°-2° C. and 4.4 parts of 17% hydrochloric acid are rapidly added. The slurry rapidly clears to a red solution which on stirring for ¾ hour becomes somewhat browner. 30 parts water are added and 5.0 parts of sodium chloride are dissolved in the solution. The red precipitate is filtered off, and the residue is redissolved in 40 parts of water. After adding decolorizing carbon, the solution is clarified and salt is added to complete precipitation. The precipitate is filtered off and the residue is ground with an equal weight of partially dehydrated magnesium sulfate-sodium sulfate mixture (ratio of 2 to 1). A dry blend of the diazonium chloride, readily soluble in water is obtained.

*Example 7*

1.0 part of the blended diazonium chloride obtained as described in Example 6 is dissolved in 27 parts of water, 2 parts of 40% acetic acid and 70 parts of suitable carbohydrate thickener are added. The resulting paste is printed from an engraved roll on cotton piece goods previously impregnated from an alkaline bath with the anilide of 2-hydroxy-3-naphthoic acid. The print is dried at 60° C., is rinsed in warm water, is cleared in a 3% soda ash bath at 60° C., is treated at 65° C. in a 1% soap solution, is rinsed again and dried.

The pattern is evenly printed a strong blue of bright reddish shade.

*Example 8*

0.3 part of the blended diazonium chloride obtained as in Example 6 is dissolved in 200 parts of water and 5 parts of 20% sodium acetate are added. While stirring efficiently, 5.0 parts of cotton piece goods previously impregnated with the beta-naphthylamide of 2-hydroxy-3-naphthoic acid in an alkaline bath are entered. The goods are stirred until color development is complete whereupon the goods are rinsed, cleared and soaped as described in Example 7.

A strong blue dyeing of high brilliance is obtained.

When, instead of the alpha-naphthylamide of 2-hydroxy-3-naphthoic acid, the ortho-phenetidide is substituted a blue dyeing of somewhat redder shade is received.

Example 9

3.3 parts of the amino-azo dyestuff prepared as described in Example 5 are stirred in 30 parts of 50% acetic acid and chilled to 5° C. 0.8 part of sodium nitrite is added and the slurry is treated with 9 parts of 17% hydrochloric acid. Stirring is cotinued for one-half hour. At this time, the clear diazo solution is divided into four equal parts, each portion being about 12 parts by volume. To each portion is added 50 parts of flake ice, 350 parts of water and 20 parts of 20% sodium acetate.

Four pieces of cotton piece goods, each of 5 parts by weight, are wetted at 60° C. in a 1% soap solution and are rinsed well in fresh water. These goods are then treated for 10 minutes at 45° C. in naphthol baths containing 1.0 part of the coupling component (naphthol); 4 parts of beta-hydroxyethyl ether; 5 parts of 30° Bé. caustic and 300 parts of water. The goods, so impregnated, are separately wrung out and are then separately entered and turned in the four buffered diazo baths prepared as above. After turning until full color development, the goods are rinsed in lukewarm water, cleared at 60° C. in a 3% soda ash bath, treated at 65° C. in a 1% soap solution, rinsed in fresh water and dried. The colors produced in each case with the naphthol employed are summarized below:

| Coupling Component (Naphthol) | Cotton Dyeing |
|---|---|
| 1. 2-Hydroxy-3-naphthoic acid-2'-naphthylamide | royal blue. |
| 2. 2-Hydroxy-3-carbazole carboxylic acid (2'-methlanilide). | purple. |
| 3. Bis-acetoacetic-o-tolidide | scarlet. |
| 4. 2-Hydroxy-3-naphthoic acid-(2'-methyl-4'-chloroanilide). | greenish blue. |

Example 10

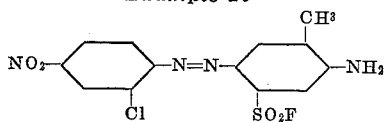

1.8 parts of 2-chlor-4-nitroaniline (93%) and a very small amount of the dibutyl ester of sodium sulfosuccinic acid are well pasted in 15 parts of water and 0.74 part of sodium nitrite is dissolved in the solution. This mixture is added to 5.5 parts of hydrochloric acid (1.19) diluted with an equal weight of water. Ice is then added to lower the temperature to 0° and the cold mixture is stirred for ½ hour. At this time, solid sulfamic acid is added to destroy excess sodium nitrite present and the solution is clarified. The clear diazo solution so obtained is added rapidly to a solution obtained by dissolving 2.1 parts of 3-amino-4-methyl benzene sulfonyl fluoride in 50 parts of water containing sufficient hydrochloric acid (1.19) to dissolve the amine. While stirring, solid sodium acetate is added until the solution is just basic against Congo red test paper. When coupling is complete, the yellow solid is collected on the filter, is washed with fresh water, and is dried at 40° C.

Example 11

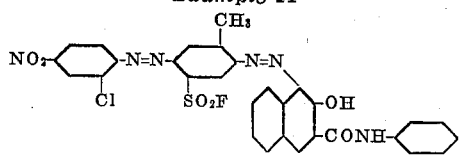

1.9 parts of 2-(2'-chloro-4'-nitrophenylazo)-4-methyl-5-aminobenzene sulfonyl fluoride are stirred in 3 parts of water to a smooth slurry and are treated with 5.5 parts of 17% hydrochloric acid. The temperature is adjusted at 5° C. and the slurry is diazotized by the addition of a 10% sodium nitrite solution to a positive nitrous acid test when spotted against starch iodide paste. The diazo solution is clarified.

1.3 parts of the anilide of 2-hydroxy-3-naphthoic acid are pasted in 1 part of methyl alcohol and 6 parts of 20% sodium hydroxide solution are added. 50 parts of water are then added and the temperature is adjusted at 5° C. While stirring, the above-prepared diazo solution is rapidly entered and the insoluble red pigment formed is filtered off and is washed with water. After drying, a red pigment is obtained insoluble in water.

We claim:

1. Disazo dyestuffs having the following formula:

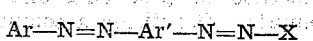

in which Ar is a radical of the benzene series free from water solubilizing groups, Ar' is a para-arylene radical selected from the group consisting of the benzene and naphthalene series free from water solubilizing groups at least one of the benzene series radicals containing at least one sulfonyl fluoride group, and X is a residue of an ice color coupling component.

2. Disazo dyestuffs having the following formula:

in which Ar is a radical of the benzene series containing a single sulfonyl fluoride group and free from water solubilizing groups, Ar' is a para-arylene radical selected from the group consisting of the benzene and naphthalene series free from water solubilizing groups and X is a residue of an ice color coupling component.

3. Disazo dyestuffs according to claim 1 in which the residue of the ice color coupling component is a residue of an arylamide of 2-hydroxy-3-naphthoic acid.

4. Disazo dyestuffs according to claim 2 in which the residue of the ice color coupling component is a residue of an arylamine of 2-hydroxy-3-naphthoic acid.

5. Disazo dyestuffs according to claim 1 in which the para-arylene radical is a para-phenylene radical.

6. Disazo dyestuffs according to claim 1 in which the para-arylene radical is a para-phenylene radical and the ice color coupling component is an arylamide of 2-hydroxy-3-naphthoic acid.

7. Disazo dyestuffs according to claim 2 in which the para-arylene radical is a para-phenylene radical.

8. Disazo dyestuffs according to claim 2 in which the para-arylene radical is a para-phenylene radical and the ice color coupling component is an arylamide of 2-hydroxy-3-naphthoic acid.

9. The disazo dyestuff having the following formula:

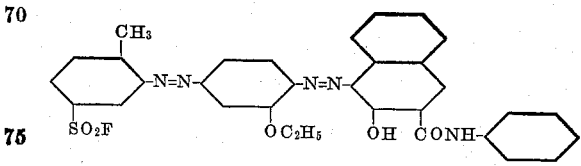

10. The disazo dyestuff having the following formula:

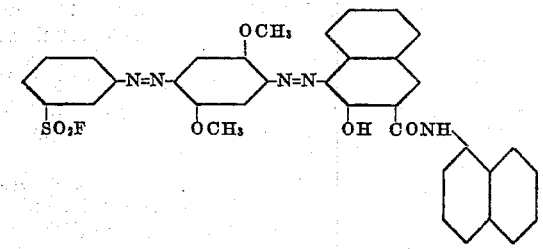

11. The disazo dyestuff having the following formula:

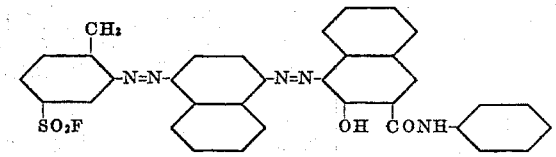

12. A method of producing disazo dyestuffs which comprises diazotizing a compound having the formula:

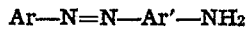

in which Ar is a radical of the benzene series free from water solubilizing groups and containing at least one sulfonyl fluoride group and Ar' is a para arylene selected from the group consisting of the benzene and naphthalene series free from water solubilizing groups and coupling with an ice color coupling component.

13. A method according to claim 12 in which the radical of the benzene series contains only a single sulfonyl fluoride group.

14. A method according to claim 12 in which the para arylene radical is a para phenylene radical.

15. A method according to claim 12 in which the ice color coupling component is an arylamide of 2-hydroxy-3-naphthoic acid.

ROBERT PRESCOTT PARKER.
CORRIS MABELLE HOFMANN.

REFERENCES CITED

The following references are of record in the file of this patent:

UNITED STATES PATENTS

| Number | Name | Date |
|---|---|---|
| 2,154,186 | Schweitzer et al. | Apr. 11, 1939 |